Aug. 20, 1929.   F. M. SEELEY   1,725,375
LAWN MOWER ATTACHMENT FOR TRACTORS
Filed Feb. 18, 1924   2 Sheets-Sheet 1

Inventor
Fayette M. Seeley

By Whittemore Hulbert Whittemore
& Belknap   Attorneys

Aug. 20, 1929.                F. M. SEELEY                1,725,375
                     LAWN MOWER ATTACHMENT FOR TRACTORS
                        Filed Feb. 18, 1924         2 Sheets-Sheet  2
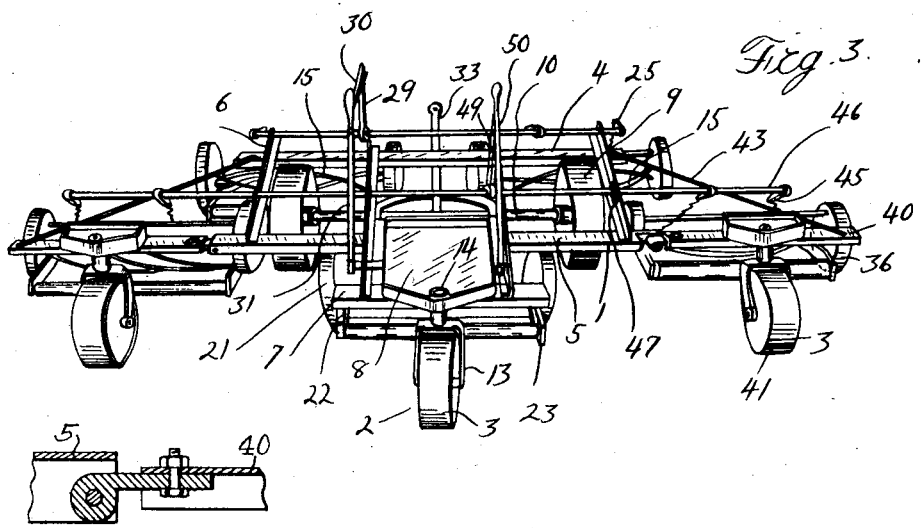
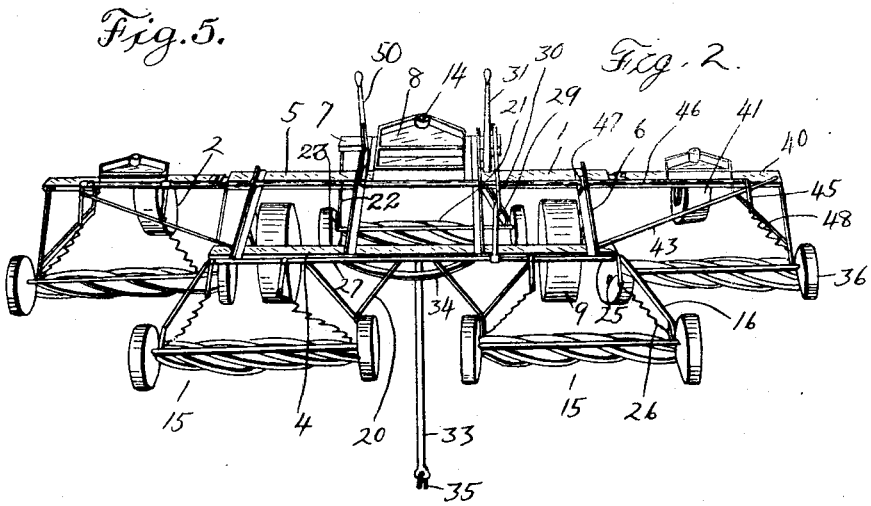

Patented Aug. 20, 1929.

1,725,375

UNITED STATES PATENT OFFICE.

FAYETTE M. SEELEY, OF LANSING, MICHIGAN, ASSIGNOR TO IDEAL POWER LAWN MOWER COMPANY, OF LANSING, MICHIGAN, A CORPORATION OF MICHIGAN.

LAWN-MOWER ATTACHMENT FOR TRACTORS.

Application filed February 18, 1924. Serial No. 693,583.

This invention relates to lawn mower attachments for tractors and the like and consists of certain novel construction as hereinafter set forth.

In the accompanying drawings:—

Figures 1 and 2 are perspective views of a lawn mower attachment embodying my invention;

Figures 3 and 4 are perspective views of a slight modification;

Figure 5 is a detail view of the detachable connection between the main and auxiliary cross bars.

Figure 4:
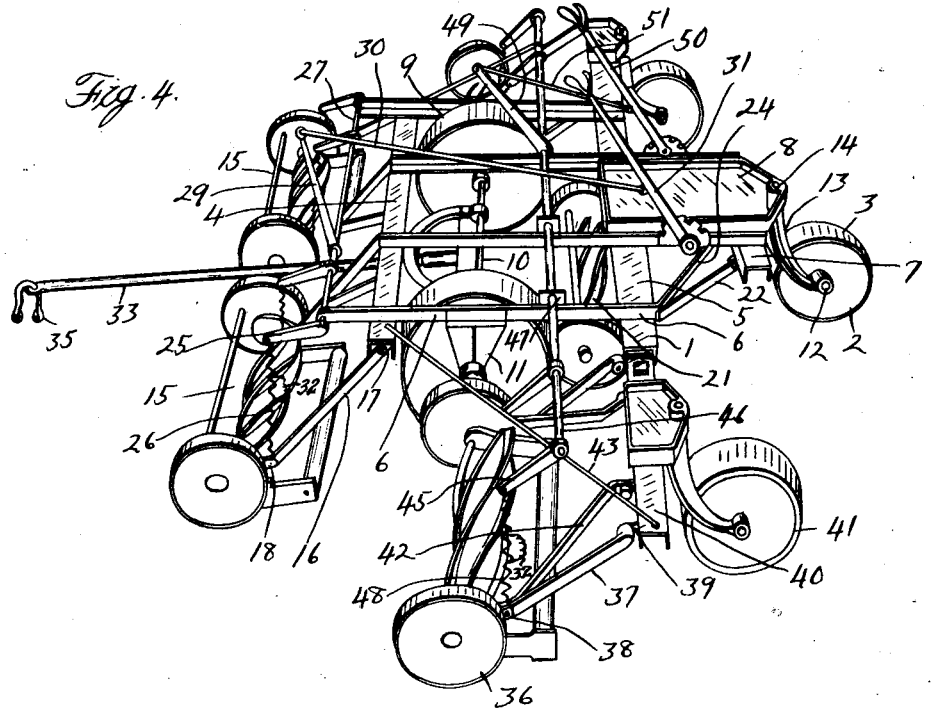
Figure 1:
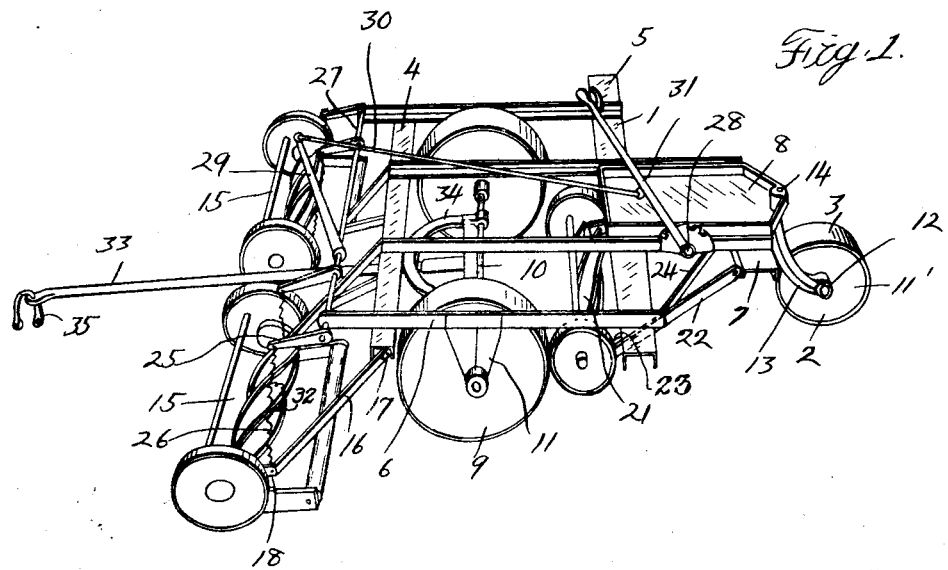

The numeral 1 designates the supporting frame of my attachment mounted upon a plurality of wheels 2 having relatively wide smooth faced rims 3. The frame preferably consists of a pair of spaced cross-bars 4 and 5 respectively and a series of spaced longitudinally extending bars 6 that are rigidly secured to the cross-bars. Two of the intermediate bars preferably project beyond the rear cross-bar 5 and are connected to a short cross-bar 7 for supporting a platform 8. In order that the frame will be exceedingly strong and durable the cross-bars are preferably formed of channel-shaped members while the bars 6 are preferably formed of angle members. The forward wheels 9 are preferably rotatably mounted on a stationary shaft 10 that is fixed in brackets 11 extending downwardly from the outermost bar 6 of the frame while the rear wheel 11' is preferably rotatably mounted on a stationary stub shaft 12 that is fixed in the arms 13 of a yoke 14 pivoted in the platform 8.

A pair of aligned mower units 15 are preferably disposed in advance of the forward cross-bar 4 and are preferably advanced over the ground by downwardly and forwardly inclined links 16 pivotally connected to lugs 17 on the forward cross-bar of the frame and to the side frames 18 of the mower units. To permit the mower units to follow the contour of the ground, the pivotal connections at both the upper and lower ends of the links are preferably loose as shown in Patent Number 1,556,965, dated Oct. 13, 1925, so as to allow a limited freedom of movement of the links relative to the cross-bar and of the mower units relative to the links. To prevent the mower units moving laterally with respect to the frame, I preferably provide a pair of braces 20 that are rigidly secured to the innermost links 16 and that are loosely pivoted to lugs on the forward cross-bar 4 of the frame.

In order that the portion of the grass disposed between the mower units 15 will be cut when the attachment is moved over the ground, I preferably provide an intermediate mower unit 21 that is disposed in advance of the rear cross-bar 5 and that is advanced over the ground by downwardly and forwardly inclined links 22 pivotally connected to the cross-bar 7 and to the side frames 23 of the mower unit, the pivotal connections permitting of limited freedom of movement of the links relative to the cross-bars and of the mower unit relative to the links, the arrangement being the same as that of the links 16 for the forward mower units 15. To prevent this intermediate mower unit from moving laterally with respect to the frame, I preferably provide braces 24 that are rigidly secured to the links 22 and that are loosely pivotally connected to the cross-bar 7.

To raise the mower units so that the cutting blades thereof will not be damaged by obstructions on the ground, there are a plurality of rock arms 25 that are connected to the links 16 and 22 at the lower ends thereof by chains 26 and that are rigidly secured to transversely extending shafts 27 and 28 respectively journaled in the bars 6 of the frame. In order that all of the mower units may be raised and lowered simultaneously, I preferably provide a lever 29 that is rigidly secured to the shaft 27 intermediate the ends thereof and that is connected by a rod 30 to a hand lever 31 that is preferably formed integral with one of the rock arms 25 on the shaft 28. If desired, coil springs 32 may be connected to the links of the chains for yieldably taking up the slack to prevent the chains from engaging the cutting elements of the mower units when the same are in operation. These springs permit the chains to straighten out under the weight of the mower units as the latter moves away from the rock arms.

In use, the mower attachment is preferably pulled by a standard tractor, and for this purpose I preferably provide a drawbar 33 that is rigidly secured to a yoke 34 clamped upon the shaft 10 intermediate the intermediate bars 6. The drawbar 33 is preferably detachably connected to the usual drawbar cap (not shown) of a tractor by means of a suitable clevis 35.

If desired, an additional mower unit 36 may be provided at each side of the frame 1 as shown in Figures 3 and 4. These units are advanced over the ground by downwardly and forwardly inclined links 37 pivotally connected to the side frames 38 of the mower units and to lugs 39 on a pair of channel-shaped bars 40 that are preferably pivoted to the rear cross-bar 5 at the opposite ends thereof and that are preferably mounted on wheels 41 having wide smooth rims like the rims of the wheels 2. To permit a limited freedom of movement of the links 37 relative to the bars 40 and of the mower units 36 relative to the links 37 the pivotal connections are preferably loose like the connections between the links 16 and bar 4. The links 37 are also preferably reinforced by suitable braces 42 corresponding to the braces 24. To reinforce the construction, I preferably provide brace rods 43 that connect the outer ends of the bars 40 to the ends of the forward cross-bar 4. To raise and lower the additional mower units 36, I preferably provide a plurality of rock arms 45 that are rigidly secured to a shaft 46 journaled in bearing lugs 47 detachably secured to the bars 6 of the frame 1. These rock arms are connected to the links 37 of the mower units by chains 48. A lever 49 is rigidly secured to the shaft 46 and is adapted to be actuated by a hand lever 50 connected thereto by a rod 51. The hand lever 50 is preferably mounted on the shaft 28 to be independently movable thereon. The attachment may be readily converted from a five to a three unit outfit by merely detaching the bars 40, shaft 46 and rods 43 from the frame 1.

From the foregoing description it will be readily apparent that I have provided a very compact attachment that is exceptionally strong and durable and that can be easily and quickly connected to or disconnected from a standard tractor or the like. Furthermore, the mower units are pushed over the ground like hand mowers, consequently, they will not have the tendency to jump up when encountering heavy grass, etc. However, all of the units may be easily and quickly raised clear of the ground whenever desired to avoid any obstructions that might injure the cutting blades. This protection eliminates expensive repairs and replacements. In case of necessity the attachment may be easily backed without injury to either the sod or cutting blades. The weight of the attachment supported on wide faced wheels holds it firmly to the ground and prevents swinging or wobbling while cutting the grass. The draft connection also causes the attachment to follow the tractor perfectly irrespective whether it is in a straight path or around curves. It will also be noted that I have provided a mower attachment that may be readily connected to or disconnected from a standard tractor or the like without affecting any of the working parts thereof. Moreover, the wide faced wheels carry the entire load of the attachment, hence there is no load whatever on the cutting elements. In view of the fact the attachment may be readily converted from a five to a three unit construction, the same attachment may be used to advantage where it is desired to cut narrow spaces as well as wide.

What I claim as my invention is:—

1. In a lawn mower attachment for tractors and the like, the combination with a wheeled frame, a plurality of mower units connected thereto and forming an operative structure therewith, bars detachably connected to said frame and projecting laterally therefrom, and other mower units connected to said bars.

2. In a convertible lawn mower attachment, the combination with a wheeled frame and mower units connected thereto and forming an operative structure therewith, of bars detachably connected to said frame at opposite sides thereof, auxiliary mower units connected to said bars to be advanced thereby, and reinforcing means connecting said bars to the outer ends of said frame.

3. In a convertible lawn mower attachment, the combination with a wheeled frame and mower units connected thereto and forming an operative structure therewith, of bars detachably connected to and projecting laterally from said frame, auxiliary mower units connected to said bars to be advanced thereby, and brace rods detachably connecting said bars to the outer ends of said frame.

4. In a gang lawn mower, the combination with a wheeled frame including a cross bar, and a mower attached to said frame, and forming an operative construction therewith of an auxiliary frame comprising bars secured to and laterally extending from said cross bar, and auxiliary mowers connected to said bars of the auxiliary frame.

5. In a convertible lawn mower attachment, the combination with a wheeled frame and mower units connected thereto, of detachable auxiliary mower units, and members oppositely laterally extending from said frame, and detachable from said frame to which said auxiliary units are connected.

6. In a gang lawn mower, the combination with a main wheeled frame and a mower attached thereto and forming an operative construction therewith, of an auxiliary wheeled frame at one side of said main frame, said auxiliary frame having a cross bar detachably connected to said main frame, an auxiliary mower in advance of said auxiliary frame and a pair of links pivotally connecting said auxiliary mower to said cross bar.

In testimony whereof I affix my signature.

FAYETTE M. SEELEY.